United States Patent [19]
Lockhart

[11] 3,817,985
[45] June 18, 1974

[54] NEW N-CYCLOPROPYLMETHYL AZETIDINE COMPOUNDS AND PROCESS FOR THEIR PRODUCTION

[75] Inventor: Ian Moyle Lockhart, Egham, England

[73] Assignee: Parke, Davis & Company, Detroit, Mich.

[22] Filed: Oct. 10, 1972

[21] Appl. No.: 296,181

[30] Foreign Application Priority Data
Dec. 3, 1971  Great Britain .................... 56354/71

[52] U.S. Cl. ......... 260/239 A, 424/244, 260/465 F, 260/471 R, 260/544 L
[51] Int. Cl. ............................................ C07d 25/00
[58] Field of Search ................................ 260/239 A

[56]  References Cited
UNITED STATES PATENTS
3,491,087  1/1970  Cavalla et al. .................. 260/239 A Primary Examiner—Henry R. Jiles
Assistant Examiner—Robert T. Bond

[57]  ABSTRACT m-[1-(Cyclopropylmethyl)-3-isopentyl-3-azetidinyl]-phenol, and its acid-addition salts and phenolate salts. The compounds have pharmacological activity and exhibit a selective pattern of analgesic action. They can be produced by reducing the carbonyl group of m-[1-(cyclopropylcarbonyl)-3-isopentyl-3-azetidinyl]phenol. The starting material can be obtained by a sequence of steps beginning with the reaction of diethyl carbonate, m-methoxyphenylacetonitrile, sodium ethoxide, and 1-bromo-3-methylbutane, followed by operations to form the azetidine ring and introduce the N-cyclopropylcarbonyl group.

1 Claim, No Drawings

NEW N-CYCLOPROPYLMETHYL AZETIDINE COMPOUNDS AND PROCESS FOR THEIR PRODUCTION

SUMMARY AND DETAILED DESCRIPTION

The present invention relates to new azetidine compounds. More particularly, the invention relates to m-[1-(cyclopropylmethyl)-3-isopentyl-3-azetidinyl]phenol of the formula

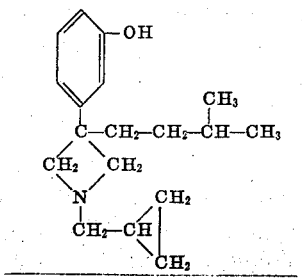

to salts thereof, and to methods for the production of the foregoing compounds.

In accordance with the invention, the foregoing compounds can be produced by reacting m-[1-(cyclopropyl-carbonyl)-3-isopentyl-3-azetidinyl]phenol of the formula

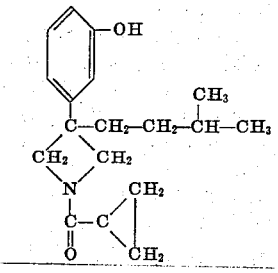

with a complex metal hydride reducing agent under anhydrous conditions, followed by hydrolyzing the product. Some examples of suitable complex metal hydride reducing agents are lithium aluminum hydride and mixtures of lithium aluminum hydride and aluminum chloride. The preferred reducing agent is lithium aluminum hydride. Some examples of suitable solvents for the anhydrous stage of the process are ethers such as diethyl ether, tetrahydrofuran, dioxane, 1,2-dimethoxy-ethane, and diethylene glycol diethyl ether. The time and temperature of the reaction are not critical. In general, the reaction is carried out at from about 0° to 100° C. or at the reflux temperature of the reaction mixture for from less than one hour to about 24 hours. Using tetrahydrofuran as solvent, the reaction is substantially complete within 5 hours at the reflux temperature. While the reactants can be used in equivalent amounts, it is preferred to use a substantial excess of the complex metal hydride reducing agent. Following the anhydrous stage of the process, the reaction mixture is hydrolyzed with an aqueous medium such as water, a dilute aqueous acid, or a dilute aqueous base. The product can be isolated as an acid-addition salt, as the free base, or as a phenolate salt, following adjustment of the pH as required.

The starting material required for use in the foregoing process can be prepared in any of a variety of ways. According to one such method, diethyl carbonate is reacted with m-methoxyphenylacetonitrile in the presence of sodium ethoxide and the product reacted with 1-bromo-3-methylbutane to give ethyl 2-cyano-2-(m-methoxyphenyl)-5-methylhexanoate. The cyano group is converted to aminomethyl by catalytic hydrogenation and the product further converted by reaction with methylmagnesium iodide and hydrolysis of the reaction mixture to 3-isopentyl-3-(m-methoxyphenyl)azetidinone. The ketone group is reduced by reaction with lithium aluminum hydride followed by hydrolysis and the resulting 3-isopentyl-3-(m-methoxyphenyl)azetidine reacted with cyclopropylcarbonyl chloride in the presence of triethylamine to form the N-cyclopropylcarbonyl derivative. Cleavage of the ether linkage then gives m-[1-(cyclopropylcarbonyl)-3-isopentyl-3-azetidinyl]phenol. These procedures are illustrated in greater detail hereinafter.

The free base of the invention forms acid-addition salts with any of a variety of inorganic and organic acids. Pharmaceutically-acceptable acid-addition salts are formed by reaction with such acids as hydrochloric, hydrobromic, sulfuric, phosphoric, acetic, succinic, citric, maleic, and pamoic acids. The free base (free phenol) of the invention also forms pharmaceutically-acceptable phenolate salts with any of a variety of bases such as sodium hydroxide, potassium hydroxide, and strongly-basic amines. The free base and the salt forms are interconvertible by adjustment of the pH. They differ in solubility properties but in general are otherwise equivalent for the purposes of the invention. The compounds of the invention can exist in anhydrous form as well as in solvated, including hydrated forms. The hydrated forms and the solvated forms with pharmaceutically-acceptable solvents are equivalent to the anhydrous or unsolvated form for the purposes of the invention.

The compounds of the invention are new chemical compounds that are useful as pharmacological agents. They exhibit a selective pattern of analgesic action.

The analgesic activity of the compounds of the invention can be demonstrated and quantitatively determined in a standard test designed to measure the ability of a test compound to inhibit the abdominal constriction (writhing) that is observed in laboratory animals following intraperitoneal injection of acetylcholine, a known pain-producing substance. The method used has been reported by Collier et al., in the *British Journal of Pharmacology and Chemotherapy*, Vol. 32, pages 295–310, February, 1968. In this test, albino mice (Tuck T/O or similar strain) are first randomized into groups of 5, then individually stained and injected subcutaneously with a measured dose of a test compound either dissolved in 0.9 percent saline or suspended in 20 percent gum acacia. Bases insoluble in saline are first dissolved in 1 N hydrochloric acid; saline-insoluble acids are first dissolved in 1 N sodium hydroxide. Twenty minutes following administration of the test compound as a coded solution, 10 ml. per kg. body weight of a saline solution containing a standard dose of acetylcholine bromide sufficient to cause writhing in at least 9 out of 10 control animals is injected intraperitoneally. Since the writhing response to acetylcholine occurs very quickly and its incidence declines after 2 minutes, the mice are next placed in a plastic box and observed for 2 minutes by an observer, who is unaware of the drug treatment given and who records the number of mice writhing within the period. The mice are also tested for discoordination by the rotating drum method described in *Analyst*, Vol. 74, pages 592–596, 1949. By means of graded doses, the dose of test compound that inhibits writhing in 50 percent of the animals ($ED_{50}$) is determined, as may also be the dose that discoordinates 50 percent of the mice ($FD_{50}$). These values are calculated by logit analysis. (See Finney, D. J., *Statistical Method in Biological Assay*, 2nd ed., London: Griffin, 1964.) When tested by the foregoing method, known analgesic agents give an $ED_{50}$ value of less than 100 mg./kg. (subcutaneous) and an $FD_{50}/ED_{50}$ ratio greater than 4; hence, these values are taken as an indication of analgesic activity. (For example pentazocine, a known analgesic agent, gives an $ED_{50}$ value of 2.7 mg./kg.) To eliminate false positive results that may be obtained with test compounds that are anticholinergic agents, each test compound found to be active in the writhing test is also tested for anticholinergic activity by measuring its ability to protect mice from physostigmine toxicity, and its activity in this regard is compared with that of known anticholinergic agents.

m-[1-(Cyclopropylmethyl)-3-isopentyl-3-azetidinyl]phenol was shown to be an active analgesic agent when tested by the above procedures, $ED_{50}$ = 0.22 mg./kg. This compound is also active ($ED_{50}$ = 1.25 mg./kg., subcutaneous route) in suppressing abdominal constrictions (writhing) induced in rats by intraperitoneal administration of 4 percent (weight/volume) sodium chloride. On the other hand, the compound does not significantly alter the behavior of rats when a uniformly increasing mechanical pressure is applied to their tails, a test procedure in which analgesic agents of the morphine class are active. The compound is only weakly active in inhibiting the action of morphine when morphine is administered in that test. As shown by the above test results, the compounds of the present invention are analgesic agents that are not morphine-like and are not, except to a slight degree, morphine antagonists. They can be administered either orally or parenterally.

The invention is illustrated by the following example.

EXAMPLE:

With stirring, a suspension of 2.0 g. of lithium aluminum hydride and 25 ml. of dry tetrahydrofuran is treated dropwise with a solution of 7.7 g. of m-[1-(cyclopropylcarbonyl)-3-isopentyl-3-azetidinyl]phenol in 50 ml. of dry tetrahydrofuran. After the reaction subsides, the mixture is stirred at reflux three and one-half hours and at room temperature overnight. The resulting mixture is hydrolyzed by dropwise addition of 30 ml. of water and then filtered. The filtrate is concentrated to dryness and the residue stirred with 100 ml. of 2 N hydrochloric acid. The acidic mixture is made basic with 6 N ammonium hydroxide and extracted with three 50 ml. portions of chloroform. The chloroform extracts are combined, washed with water, dried over anhydrous sodium sulfate, and then concentrated. Distillation of the residual black oil in vacuo yields a pale yellow glass, b.p. 180° C. (0.5 mm.). It is m-[1-(cyclopropylmethyl)-3-isopentyl-3-azetidinyl]phenol.

A solution of 2.25 g. of the above product in ether is added to a solution of 3.18 g. of D-(-)-tartaric acid, di-p-toluate ester in 20 ml. of hot absolute ethanol. The mixture is cooled and then concentrated in vacuo to yield the hydrated salt with D-(-)-tartaric acid, di-p-toluate ester, m.p. greater than 90° C. (slow decomposition). The hydrochloride and hydrobromide are prepared by reaction of the free base with hydrogen chloride and hydrogen bromide. The sodium salt is prepared by adding 10 ml. of 1 N sodium hydroxide to a solution of 2.73 g. of the free base (free phenol) in ethanol and evaporating the mixture to dryness. By substituting equivalent amounts of potassium hydroxide and choline for the sodium hydroxide, the potassium and choline salts are obtained.

The starting material is obtained as follows. A solution of sodium ethoxide (prepared by addition of 12.0 g. of sodium to 300 ml. of anhydrous ethanol) is stirred vigorously at room temperature and treated successively with 300 ml. of diethyl carbonate and 80 ml. of toluene. The resulting mixture is then slowly heated to reflux and 73.5 g. of m-methoxyphenylacetonitrile is added. After addition is complete, the reaction mixture is distilled until its temperature reaches 110° C. During distillation, the volume of the reaction mixture is maintained constant by continuous addition of toluene. The mixture is concentrated until it solidifies upon cooling, and the residue treated with 151 g. of 1-bromo-3-methylbutane. This mixture is stirred at reflux 5 hours, allowed to stand at room temperature overnight, diluted with 300 ml. of water, and acidified with glacial acetic acid. The organic layer is separated and the aqueous layer extracted three times with 100 ml. portions of ether. The combined organic layers are then dried over anhydrous sodium sulfate and concentrated in vacuo. Distillation yields a colorless liquid, b.p. 148–154° C. (0.8–1.0 mm.); $n_D^{25}$ 1.4959. It is ethyl 2-cyano-2-(m-methoxyphenyl)-5-methylhexanoate.

A mixture of 120 g. of the above product, 50 g. of Raney nickel, and 600 ml. of ethanol is shaken in a hydrogen atmosphere at 90° C. and 900 pounds per square inch pressure until the calculated amount of hydrogen has been absorbed. After cooling overnight, the mixture is filtered, and the filtrate concentrated in vacuo. A solution of the residue in 500 ml. of ether is extracted three times with 150 ml. of 2 N hydrochloric acid. The aqueous extracts are combined and made basic with 10 N sodium hydroxide. The basic mixture is extracted with ether and the ether extract is washed with 100 ml. of water, dried over anhydrous sodium sulfate, and concentrated in vacuo. Distillation of the residue yields a colorless liquid, b.p. 132°–138° C. (0.4–0.5 mm.). It is ethyl 2-aminomethyl-2-(m-methoxyphenyl)-5-methylhexanoate.

With stirring and external cooling to 5°–10° C., a solution of methylmagnesium iodide (prepared from 42 g. of magnesium, 120 ml. of methyl iodide, and 500 ml. of ether) is treated with a solution of 97.5 g. of ethyl 2-aminomethyl-2-(m-methoxyphenyl)-5-methylhexanoate in 500 ml. of ether. After five hours, the reaction mixture is allowed to stand overnight at room temperature, cooled to 0° C., and treated slowly with 400 ml. of saturated ammonium chloride solution. The resulting mixture is treated further by addition of 300 ml. of 2 N hydrochloric acid and then stirred one hour. The organic phase is separated, washed successively with 300 ml. of sodium bicarbonate solution, 100 ml. of water, 100 ml. of dilute sodium thiosulfate solution, and again with water. The organic phase is dried over anhydrous sodium sulfate, and concentrated in vacuo to give an oily residue of 3-isopentyl-3-(m- methoxyphenyl)azetidinone, suitable for use without further purification.

With stirring, a solution of 25 g. of the above product in 250 ml. of anhydrous ether is added to a suspension of 10.5 g. of lithium aluminum hydride and 100 ml. of anhydrous ether at room temperature. The resulting mixture is heated and stirred at reflux two and one-half hours and then allowed to stand at room temperature overnight. Cautious addition of 50 ml. of saturated ammonium chloride solution precipitates inorganic solids which are removed from the reaction mixture by filtration. The filtrate is extracted with two 100 ml. portions of 2 N hydrochloric acid and these extracts are made basic with 10 N sodium hydroxide. The basic mixture is extracted three times with 100 ml. portions of ether, and the ether extracts are combined, washed with 100 ml. of water, dried over anhydrous sodium sulfate, and concentrated in vacuo. Distillation of the brown oily residue yields a colorless liquid, b.p. 130° C. (0.5 mm.). It is 3-isopentyl-3-(m-methoxyphenyl)azetidine.

With stirring at room temperature, 3.0 g. of cyclopropylcarbonyl chloride is cautiously added to a solution of 7.0 g. of 3-isopentyl-3-(m-methoxyphenyl)azetidine in 25 ml. of triethylamine. Following a vigorous exothermic reaction, the mixture is stirred at room temperature overnight and then filtered to remove triethylamine hydrochloride. The filtrate is concentrated in vacuo and the residue extracted with chloroform. The chloroform extract is washed successively with 50 ml. of saturated sodium bicarbonate solution, water, 50 ml. of 2 N hydrochloric acid and water again. After drying over anhydrous sodium sulfate, this solution is concentrated in vacuo to give an oily residue of N-cyclopropylcarbonyl-3-isopentyl-3-(m-methoxyphenyl)azetidine, suitable for use without further purification.

With stirring and external cooling at −60° C., a solution of 8.5 g. of N-cyclopropylcarbonyl-3-isopentyl-3-(m-methoxyphenyl)azetidine in 75 ml. of methylene dichloride is treated dropwise with 8.5 ml. of boron tribromide. After addition is complete, the reaction mixture is allowed to warm to room temperature and stirred for two hours. The mixture is then cooled to −30° C. and 25 ml. of methanol is added. The resulting mixture is concentrated and the residue dissolved in 100 ml. of 2 N sodium hydroxide solution. Solid carbon dioxide is added and a gum precipitates from the alkaline mixture. The precipitate is extracted with chloroform and the extract is washed with 50 ml. of water and then dried over anhydrous sodium sulfate. The chloroform is removed by evaporation to give a residue of m-[1-(cyclopropylcarbonyl)-3-isopentyl-3-azetidinyl]phenol, suitable for use without further purification.

I claim:

1. A member of the class consisting of M-[1-(cyclopropylmethyl)-3-isopentyl-3-azetidinyl]phenol and pharmaceutically acceptable salts thereof.

* * * * *